United States Patent
Wu

(10) Patent No.: US 9,251,289 B2
(45) Date of Patent: Feb. 2, 2016

(54) MATCHING TARGET STRINGS TO KNOWN STRINGS

(75) Inventor: Enyuan Wu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 948 days.

(21) Appl. No.: 13/229,369

(22) Filed: Sep. 9, 2011

(65) Prior Publication Data

US 2013/0066898 A1    Mar. 14, 2013

(51) Int. Cl.
*G06F 17/30* (2006.01)

(52) U.S. Cl.
CPC .... *G06F 17/30961* (2013.01); *G06F 17/30864* (2013.01)

(58) Field of Classification Search
CPC .................. G06F 17/30864; G06F 17/30867; G06F 17/30067; G06F 17/3061
USPC ................................................ 707/705, 769
See application file for complete search history.

(56) References Cited

U.S. PATENT DOCUMENTS

| | | | | |
|---|---|---|---|---|
| 5,692,176 | A * | 11/1997 | Holt et al. | 715/205 |
| 6,047,283 | A | 4/2000 | Braun | |
| 6,694,323 | B2 | 2/2004 | Bumbulis | |
| 7,613,687 | B2 | 11/2009 | Nye | |
| 7,921,140 | B2 | 4/2011 | Kim et al. | |
| 2009/0210412 | A1 * | 8/2009 | Oliver et al. | 707/5 |
| 2009/0299973 | A1 | 12/2009 | Kataoka et al. | |
| 2010/0280981 | A1 * | 11/2010 | Kato et al. | 706/20 |
| 2012/0078919 | A1 * | 3/2012 | Mineno | 707/748 |

OTHER PUBLICATIONS

Huang, Chen., "EECS586 Term Project: What's behind Google", Retrieved at <<http://www-personal.umich.edu/~chhuang/papers/ChenHuangEECS586.pdf>>, Apr. 14, 2008, pp. 1-6.
Mouza, et al., "AS-Index: A Structure for String Search Using n-grams and Algebraic Signatures", Retrieved at <<http://citeseerx.ist.psu.edu/viewdoc/download?doi=10.1.1.158.9125&rep=rep1&type=pdf>>, Research Report CERIA, Apr. 2008, pp. 10.
"Full Text Search", Retrieved at <<http://en.wikipedia.org/wiki/Full_text_search>>, Retrieved on Jun. 16, 2011, pp. 4.
"SQL Server 2005 Books Online (Nov. 2008)—Understanding Ranking", Retrieved at <<http://technet.microsoft.com/en-us/library/ms142524(SQL.90).aspx>>, pp. 4.
"B-tree", Retrieved at <<http://en.wikipedia.org/wiki/B-tree>>, Retrieved on Jun. 16, 2011, pp. 12.
"Approximate String Matching" Retrieved at: http://en.wikipedia.org/wiki/Approximate_string_matching, Retrieved on: Aug. 24, 2011.
"Fuzzy Matching", Retrieved at: http://en.wikipedia.org/wiki/Fuzzy_matching, Retrieved on: Aug. 24, 2011.

* cited by examiner

*Primary Examiner* — Vincent F Boccio
(74) *Attorney, Agent, or Firm* — Timothy Churna; Doug Barker; Micky Minhas

(57) ABSTRACT

One or more techniques and/or systems are disclosed for matching a target string to a known string. A target string is broken into one or more target terms, and the one or more target terms are matched to known terms in an index tree. The index tree comprises one or more known terms from a plurality of known strings, where the respective known terms in the index tree are associated with one or more known string IDs. A known term that is associated with a known string ID (in the index tree, and to which a target term is matched), is comprised in a known string, which corresponds to the known string ID. The target string can be matched to the known string using the known string's corresponding known string ID that is associated with a desired number of occurrences in the matching of the one or more target terms.

20 Claims, 9 Drawing Sheets

MATCHING TARGET STRINGS TO KNOWN STRINGS

BACKGROUND

Searching for relevant information in a large pool of data is commonly performed in enterprise operations, academic operations, and by individual users. Internet search engine and database management systems are typical examples of ways that users may search for data that matches query search terms. Typical systems and techniques utilize a "full text search" in an attempt to match query terms to one or more portions of the data in the large pool of data.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

For a given large collection of random and unstructured known strings, a user may wish to quickly search through all the known strings to select a known string that matches a target string. For example, where there are many known strings that comprise phrases in English for which a translation into another language already exists, it may be desirable to find which of these phrases (known string) match a phrase in English (target string) for which a translation into the other language does not already exist. In this manner, the phrase (target string) for which a translation does not exist may not have to be translated. Rather, the translation for the know phrase (known string) to which that phrase (target string) matches may be used for that phrase (target string). Generally, to perform operations such as this, full-text search engines typically utilize a type of fuzziness matching (e.g., linguistic matching), which may provide too much "fuzziness" (e.g., results that are overly imprecise). These systems are typically very slow, and they often utilize a relative score for respective matched candidates, which is not intuitive and can be difficult to understand.

Accordingly, one or more techniques and/or systems are disclosed that can provide fast, efficient, and improved matching of a target string to a known string. An index of known terms from a plurality of known strings can be created merely once for the plurality of known strings, and the index can be modified/updated if needed. Searching of the index can be performed on-demand for target strings, where results from the searching of the index can result in one or more matching known strings for the target string.

In one embodiment of matching a target string to a known string, respective one or more target terms, comprised in the target string, can be matched to a known term in an index tree. The index tree can comprise one or more known terms from a plurality of known strings, where the respective known terms in the index tree are associated with at least one known string identifier (ID). A known term that is associated with a known string ID, and that is matched to the target term in the index tree, is comprised in a known string, which corresponds to the known string ID. The target string can be matched to the known string based at least upon the known string's corresponding known string ID being associated with a desired number of occurrences in the matching of the one or more target terms.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
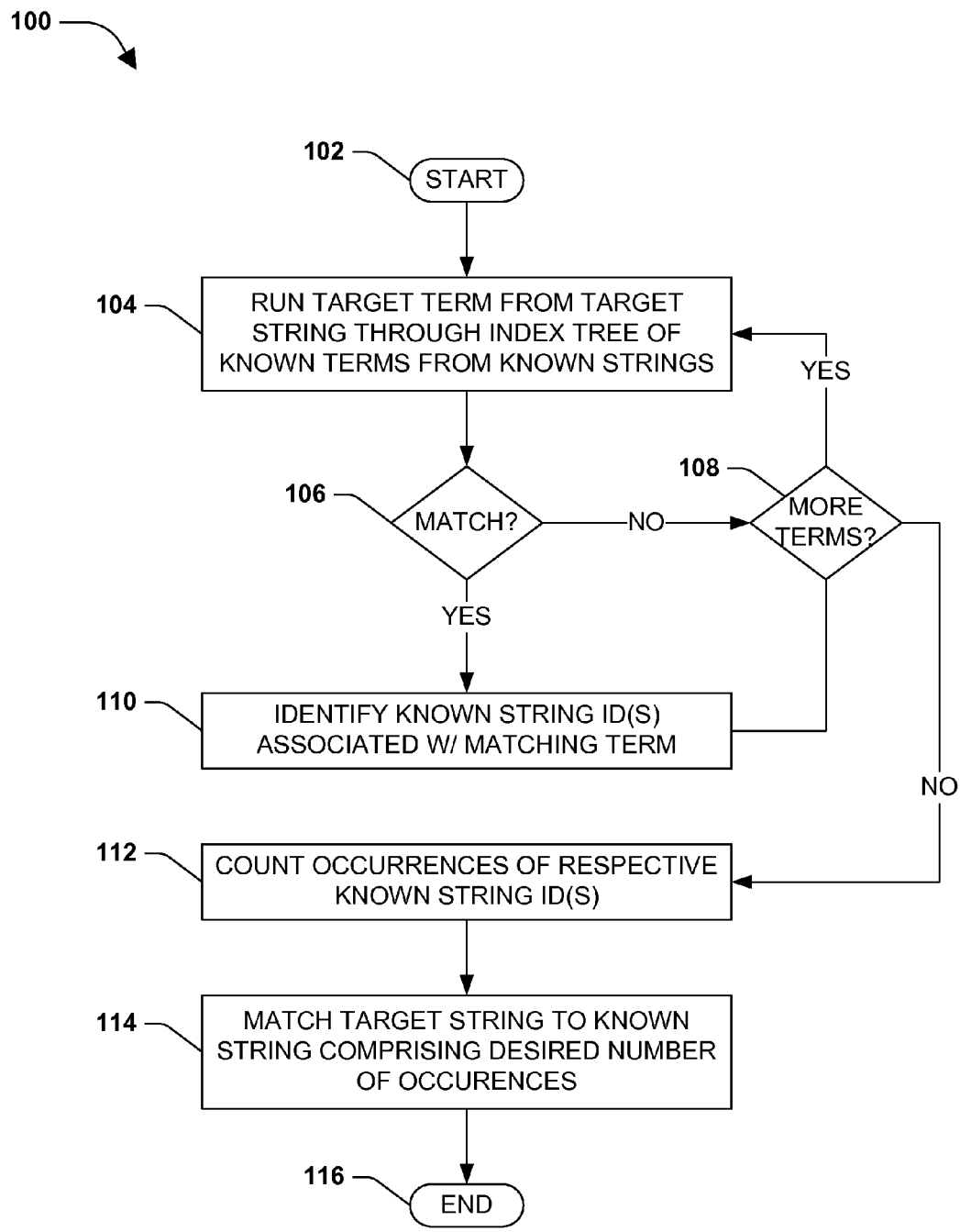
FIG. 1 is a flow diagram illustrating an exemplary method for matching a target string to a known string.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

As provided herein, a method may be devised that provides for fast, efficient, and improved matching of a target string to a known string. An index of known terms from a plurality of known strings can be created for the plurality of known strings, where the respective known terms are associated, in the index tree, to a known string ID. The known string ID corresponds to a known string that comprises the known term associated with the known string ID in the index tree. The index tree can be searched for target terms from a target string, where results from the searching of the index can result in one or more matching known strings for the target string.

FIG. 1 is a flow diagram illustrating an exemplary method 100 for matching a target string to a known string. The exemplary method begins at 102, and involves running a target term from a target string through an index tree comprising known terms from known strings, at 104. The target term can comprise a search term, for example, which can be used to search through the index tree to identify a matching known term.

In the exemplary method 100, the index tree comprises one or more known terms that are comprised in a plurality of known strings. The known terms comprised in the index tree are respectively associated with at least one known string identifier (ID), where an associated known string ID corresponds to a known string that comprises the known term. For example, a known string may comprise one or more known terms. Further, in this example, the known string has a corresponding known string ID (e.g., which may be particular to the known string to distinguish it from other known strings). The respective known terms that are comprised in the known string, in this example, are associated with the known string ID for the known string from which they came.

Therefore, as an example, the index tree that may be populated with known terms can be further populated with the associated known string IDs for the known terms. Further, a known term populated in the index tree may be associated with more than one known string ID. As an illustrative example, a known term "table" may be found in more than one known string, such as a first known string "the cat is on the table," and a second known string "the table is big." In this example, a first known string ID corresponding to the first known string can be associated with the known term "table", and a second known string ID corresponding to the second known string can be associated with the known term "table" (e.g., in the index tree).

If a matching known term is identified in the index tree for the target term (YES at 106), one or more known string IDs associated with the matching known term in the index tree can be identified at 110. If a matching known term is not identified in the index tree for the target term (NO at 106), or after identifying the one or more known string IDs associated with the matching known term in the index tree at 110, a next target term may be identified. If a next target term is identified for the target string (e.g., the target string comprises more than one target term) (YES at 108), the next target term can be run though the index tree to identify a matching known term, at 104. The process of 104 to 110 can be iterated until no more target terms are available for the target string (NO at 108).

As an example, the target string may comprise four target terms. In this example, respective target terms can be run through the index tree to search for a matching known term, comprising four searches of the index tree. Further, in this example, if the respective searches identify a matching known term, four sets of known string IDs may be identified, one for the respective matching known terms, where respective sets may comprise one or more known string IDs. If one or more of the four searches do not result in a matching known term, in this example, a resulting number of sets of known string IDs may correspond to a number of matching known terms from the four target term searches of the index tree.

At 112 in the exemplary method 100, a number of occurrences of respective known strings IDs can be counted, resulting from the running of the one or more target terms through the index tree. As described above, the running of the one or more target terms through the index tree may respectively identify matching known terms, where the matching known term can be associated with one or more known string IDs. A same known string ID may be identified for more than one target term from the target string, for example.

As an illustrative example, a target string "select big table" can comprise three target terms "select", "big", and "table". In this example, a first known string may comprise "the table is big," corresponding to a first known string ID "X", and a second known string can comprise "the cat is on the table", corresponding to a second known string ID "Y". In this example, after running the three target terms through the index tree, a resulting identification of known string IDs may comprise: "select"->no match; "big"->"X"; and "table"->"X", Y. In this example, when the number of occurrences of respective known strings IDs are counted, a resulting count may comprise: "X"->two occurrences; and "Y"->one occurrence.

At 114 in the exemplary method 100, the target string is matched to the known string based at least upon the known string's corresponding known string ID associated with a desired number of occurrences in the matching of the one or more target terms. As an example, a desired number of occurrences may comprise a highest number of occurrences. In this example, the known string that corresponds to the known string ID with the highest number of occurrences resulting from the matching of the target terms to the known terms in the index tree can comprise the matching known string.

As an illustrative example, if the first known string ID "X" comprises two occurrences, as a result of the matching of the target terms to the known terms in the index tree, and the second known string ID "Y" comprises merely one occurrence, the first known string "the table is big" can comprise the known string that is matched to the target string "select big table." In this illustrative example, the first known string comprises two target terms "big" and "table" that are also comprised in the target string.

Having matched the target string to the known string, the exemplary method 100 ends at 116.

Figure 2:
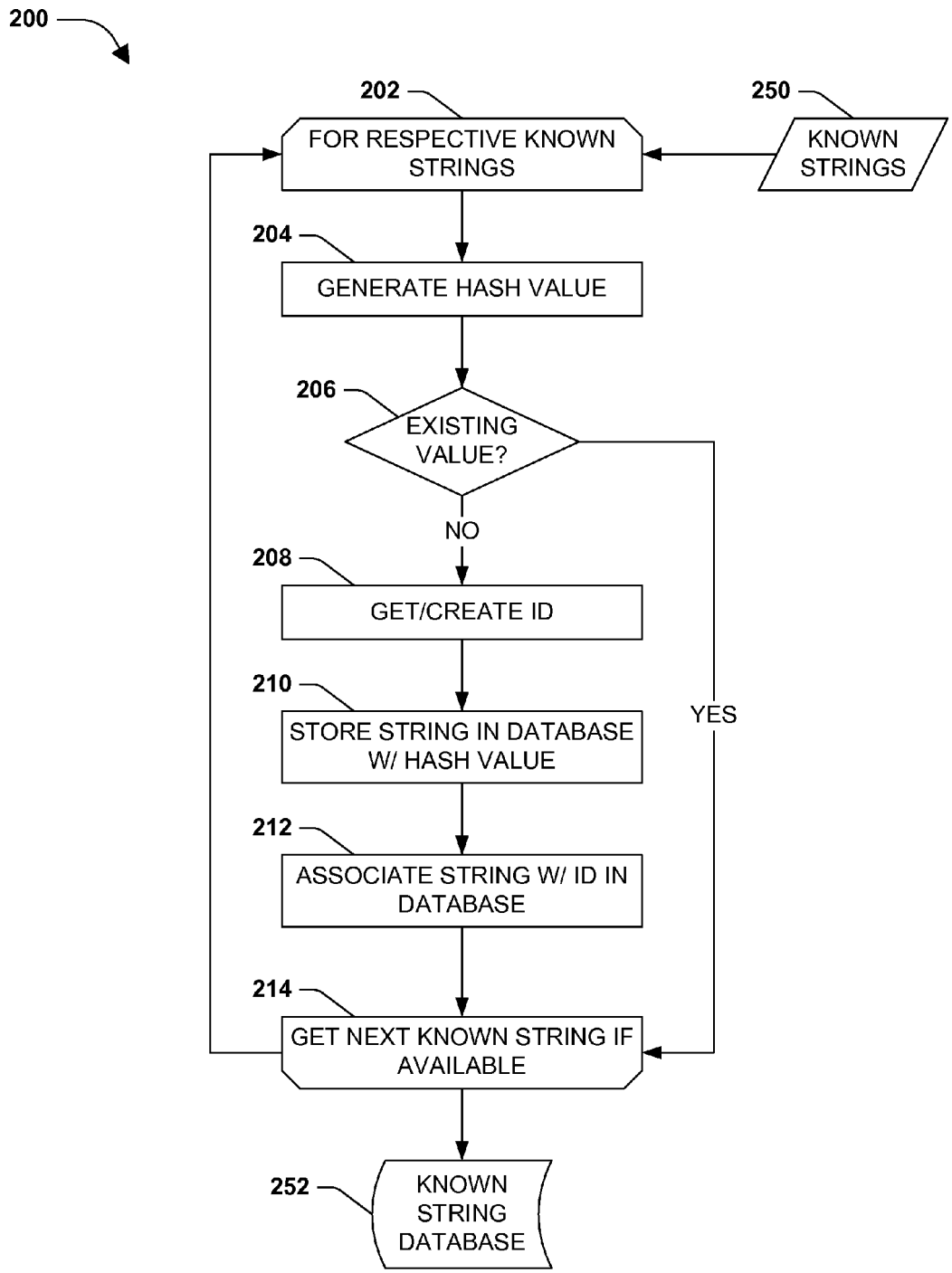
FIG. 2 is a flow diagram illustrating an example embodiment where one or more portions of one or more techniques described herein may be implemented.

FIG. 2 is a flow diagram illustrating an example embodiment 200 where one or more portions of one or more techniques described herein may be implemented, such as where a known string database may be created for a plurality of known strings. As an example, a plurality of known strings may comprise a pool of English words (e.g., or some other language), phrases, and sentences that are known (e.g., in a translation memory pool, in a search query pool, in a database pool, etc.). It will be appreciated that a known string is not limited to a known language-based string, phrase, and/or sentence. A known string can comprise any representation of an arrangement of characters, where the arrangement of characters is known. Further, a plurality of known strings can comprise any pool of known arrangements of characters.

At 202 in the example embodiment 200, an iterative process (202 to 214), for identifying data used to populate the known string database 252, can begin for respective known strings in the plurality of known strings 250. At 204, a hash value can be generated for a known string 250. In one embodiment, the hash value can be generated for the known string using one or more hash functions. Typically, hashing an input value (e.g., the known string) results in a hash value that is particular to the input value, for example, where different input values are respectively hashed to different hash values. In this way, for example, a first hash value derived from a first known string may be different than a second hash value derived from a second known string.

At 206, the hash value generated for the known hash string 250 can be compared with any existing hash values in the known string database 252. It will be appreciated that, when the iterative process 202 to 214 is first initiated, the known string database may comprise no known strings and associated hash values. Therefore, as an example, for a first known string run through the iterative process 202 to 214, a first hash value may be compared with no hash values in an empty database. Further, in this example, a second hash value for a second known string may be compared merely with the first hash value in a second run through the iterative process 202 to 214, and so on for a third, fourth, etc. hash value.

If the hash value generated for the known hash string 250 already exists in the known string database (YES at 206), a next known string, at 214, may be identified from the known strings 250, and run through the iterative process 202 to 214, beginning at 202. If the hash value generated for the known hash string 250 does not already exists in the known string database (NO at 206), a known string ID may be determined for the known string 250.

In one embodiment, determining the known string ID for the known string can comprise retrieving a first ID from a database of IDs, for example, where respective IDs in the database of IDs are different. In one embodiment, determining the known string ID for the known string can comprise creating (e.g., using a function, using a next available number from a sequence of numbers, etc.) a new ID for the known string, for example, where the newly created ID is particular to merely the known string.

At 210 in the example embodiment 200, the known string can be stored in the known string database 252 and linked to the corresponding generated hash value in the known string database 252. At 212, the known string ID determined (e.g., retrieved, created, etc.) for the known string can be associated with the known string in the known string database 252. For example, the known string database 252 may comprise an entry comprising the known string, a link to the known string ID, and/or a link to the hash value.

At 214, a next known string can be identified from the plurality of known strings 250, and the next known string can be run through the iterative process 202 to 214. In this way, for example, the resulting known string database 252 may be populated merely with different known strings (e.g., no two known strings in the database comprise the same one or more known terms in a same order), respectively linked to a different known string ID and a different hash value.

Figure 3:
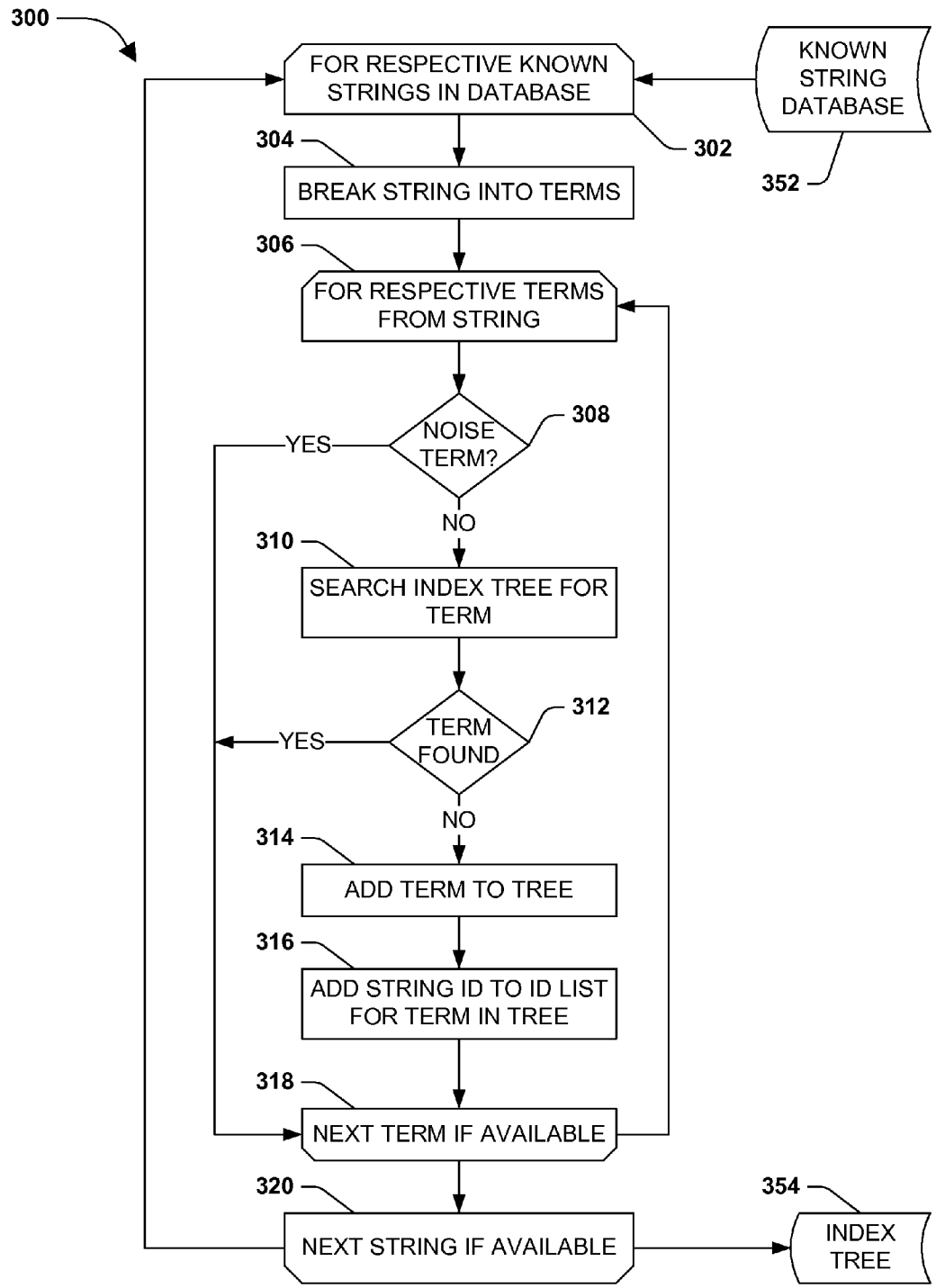
FIG. 3 is a flow diagram illustrating an example embodiment where one or more portions of one or more techniques described herein may be implemented.

FIG. 3 is a flow diagram illustrating an example embodiment 300 where one or more portions of one or more techniques described herein may be implemented, such as to generate a populated index tree. In one embodiment, the index tree may be populated with known terms from a known string database. A known term can comprise at least a portion of a known string from the known string database. As an illustrative example, a known string in the known string database may comprise the text "hosting operating systems in the cloud". In this example, a first known term may comprise the text "hosting", a second known string may comprise the text "operating", a third known term may comprise the text "systems", and so on.

At 302 in the example embodiment 300, an iterative process (302 to 320), for identifying data used to populate the index tree 354, can begin for respective known strings in the known string database 352 (e.g., 252 of FIG. 2). At 304, a first known string from the known string database 352 can be broken down into one or more first known terms. As an illustrative example, the known string "hosting operating systems in the cloud" may be broken down in the known terms "hosting", "operating", "systems", "in", "the", and "cloud".

At 306, for the respective one or more first known terms identified in the first known string, it may be determined whether the first known term comprises a "noise term." In one embodiment, a "noise term" can comprise a term that may not yield a useful search result, and may merely add "noise" to the result when matching a target string to a known string. As an example, in a language-based pool of known strings, a "noise term" may comprise a word that is very commonly found in phrases or sentences (e.g., a, the, an, as, for, it, they, was, where, you, etc.). In this example, performing a search (e.g., matching a target string to a known string) using these "noise words" may merely add "noise" to results of the search by increasing a number of target terms matched to known terms in the index tree, and may not result in useful information. As an illustrative example, a list of "noise terms" for the English language may comprise the following:

"$, 0, 1, 2, 3, 4, 5, 6, 7, 8, 9, a, b, c, d, e, f, g, h, i, j, k, l, m, n, o, p, q, r, s, t, u, v, w, x, y, z, about, after, all, also, an, and, another, any, are, as, at, be, because, been, before, being, between, both, but, by, came, can, cancel, close, come, could, did, do, does, each, else, for, from, get, got, had, has, have, he, her, here, him, himself, his, how, if, in, into, is, it, its, just, like, make, many, me, might, more, most, much, must, my, never, no, now, of, ok, on, only, or, other, our, out, over, re, run, said, same, see, should, since, so, some, still, such, take, than, that, the, their, them, then, there, these, they, this, those, through, to, too, under, up, use, very, want, was, way, we, well, were, what, when, where, which, while, who, will, with, would, you, your."

If the first known term is identified as a "noise term" (YES at 308) a next first known term may be identified (if available), at 318, from the first known string. If the first known term is not identified as a "noise term" (NO at 308) the index tree 354 may be searched for a match of the first known term at 310. It will be appreciated that, when the iterative process 302 to 320 is first initiated, the index tree 354 may comprise no known terms. Therefore, as an example, for the first known string run through the iterative process 302 to 320, a first known term may be searched against an empty index tree. Further, in this example, a second, first known term for the first known string may be searched against merely the first, first known term in a subsequent search of the index tree 354, and so on for a third, fourth, etc. first known term.

As an example, searching the index tree can comprise performing a string match, such as where the terms are matched if they respectively comprise the same characters in a same order. If the first known term from the first known string is matched to an existing known term in the index tree 354 (YES at 312) a next first known term may be identified (if available), at 318, from the first known string. If the first known term from the first known string is not matched to an existing known term in the index tree 354 (NO at 312) the first known term may be added to the index tree.

At 316 in the example embodiment 300, a first known string ID corresponding to the first known string in the known string database 352 can be added to a list of one or more known string IDs associated with the first known term in the index tree 354. As an example, respective nodes of the index tree 354 may comprise a known term comprised in one or more of the known strings from the known string database 352. Further, in this example, respective nodes can comprise a set of one or more known string IDs, associated with the known term in the node, corresponding to the one or more known strings comprising the known term.

At 318, a second known term may be identified for the first known string. If the second known term is available for the first known string, the second known term may be run through the iterative process 306 to 318, for example, and for a third known term, etc., until no more known terms are available for the first known string. At 320, a second known string may be identified from the known string database 352. If the second known string is available from the known string database 352, the second known string may be run through the iterative process 302 to 320, for example, and a third known string, etc., until no more known string are available in the known string database 352.

In one embodiment, the resulting index tree 354 can comprise a plurality of nodes respectively populated with a known term, for example, where no two nodes in the index tree 354 comprise a same known term. Further, the respective nodes may comprise a set of one or more known string IDs corresponding to the strings within which the known terms respectively appear. As an example, the index tree may comprise a B-tree. A B-tree is a tree data structure that comprises sorted data (e.g., comprising the known terms), and provides for fast searching (e.g., to match a target term to a known term), insertions (e.g., to add known terms), deletions (e.g., to remove known terms), and sequential access (e.g., providing for fast look-up and searches).

Figure 4:
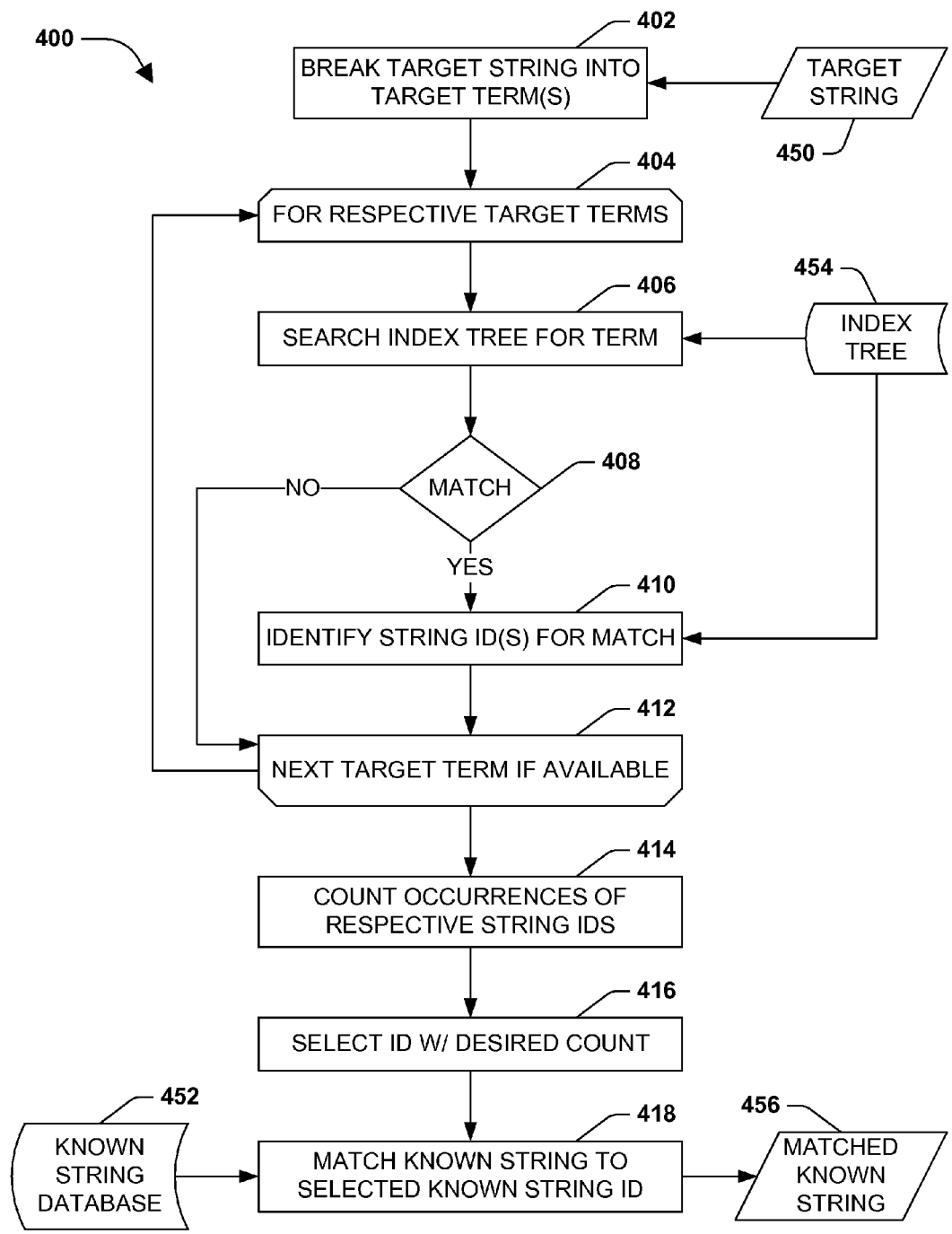
FIG. 4 is a flow diagram illustrating an example embodiment where one or more portions of one or more techniques described herein may be implemented.

FIG. 4 is a flow diagram illustrating an example embodiment 400 where one or more portions of one or more techniques described herein may be implemented, such as to match a target string to a known string. As an example, a user may wish to determine whether a target string can be matched to a known string from a plurality of known strings. As an illustrative example, the user may identify a target string comprising desired query terms from a search query, and may wish to determine whether the desired query terms of the target string match a known string in a database of known strings, where search results are already known for the known strings in the database. As another illustrative example, the target string may comprise a phrase that may be utilized in a new version of an application, and the user may wish to identify a matching known string from a pool of phrases that has previously been translated to another language (e.g., translation memory).

At 402, the target string 450 can be broken down into one or more target terms, by identifying one or more target terms comprised in the target string 450. As an illustrative example, a target string comprising the text "how to use cloud hosted operating systems" may be broken down in the target terms "how," "to," "use," "cloud," "hosted," "operating," and "systems."

In one embodiment, the identification of target terms may comprise ignoring (e.g., or removing) "noise terms" from the target string 450. As an illustrative example, for the target string "how to use cloud hosted operating systems," the terms "how," "to," and "use" may be considered "noise terms," as they may merely add noise to search results, and may not provide useful search-related information when matching a target string to a known string. Therefore, in this embodiment, for example, the target terms identified for the target string 450 may merely comprise "cloud," "hosted," "operating," and "systems."

At 404 in the example embodiment 400, an iterative process (404 to 412) can begin for the respective one or more target terms identified in the target string 450. At 406, the index tree 454 (e.g., 354 from FIG. 3) can be searched for a match to a first target term from the respective one or more target terms. As an example, searching the index tree for a match to the first target term can comprise performing a string match, such as where the target term is matched to a known term in the index tree 454 if they respectively comprise the same characters in a same order. If the first target term from the target string 450 is not matched to a known term in the index tree 454 (NO at 408) a next target term (second target term) may be identified (if available), at 412, from the target string 450. For example, if the first target term does not match a known term in the index tree 454, the target term may not comprise a known term from the plurality of known strings.

If the first known term from the target string is matched to a known term in the index tree 454 (YES at 408) one or more string IDs associated with the matching known term can be identified at 410 from the index tree 454. As described above (e.g., at 316 in FIG. 3), for example, the index tree 454 can comprise a plurality of nodes respectively comprising a known term and an associated set of one or more known string IDs, respectively corresponding to a known string in a known string database. In one embodiment, the one or more string IDs associated with the matching known term can be identified in the node of the index tree comprising the matching known term. At 412, a next (second) target term can be identified, if available, and run through the iterative process 404 to 412, for example, until there are no more target terms available for the target string 450 (e.g., all the target terms from the target string have been run through the matching process 404 to 412).

Figure 5:
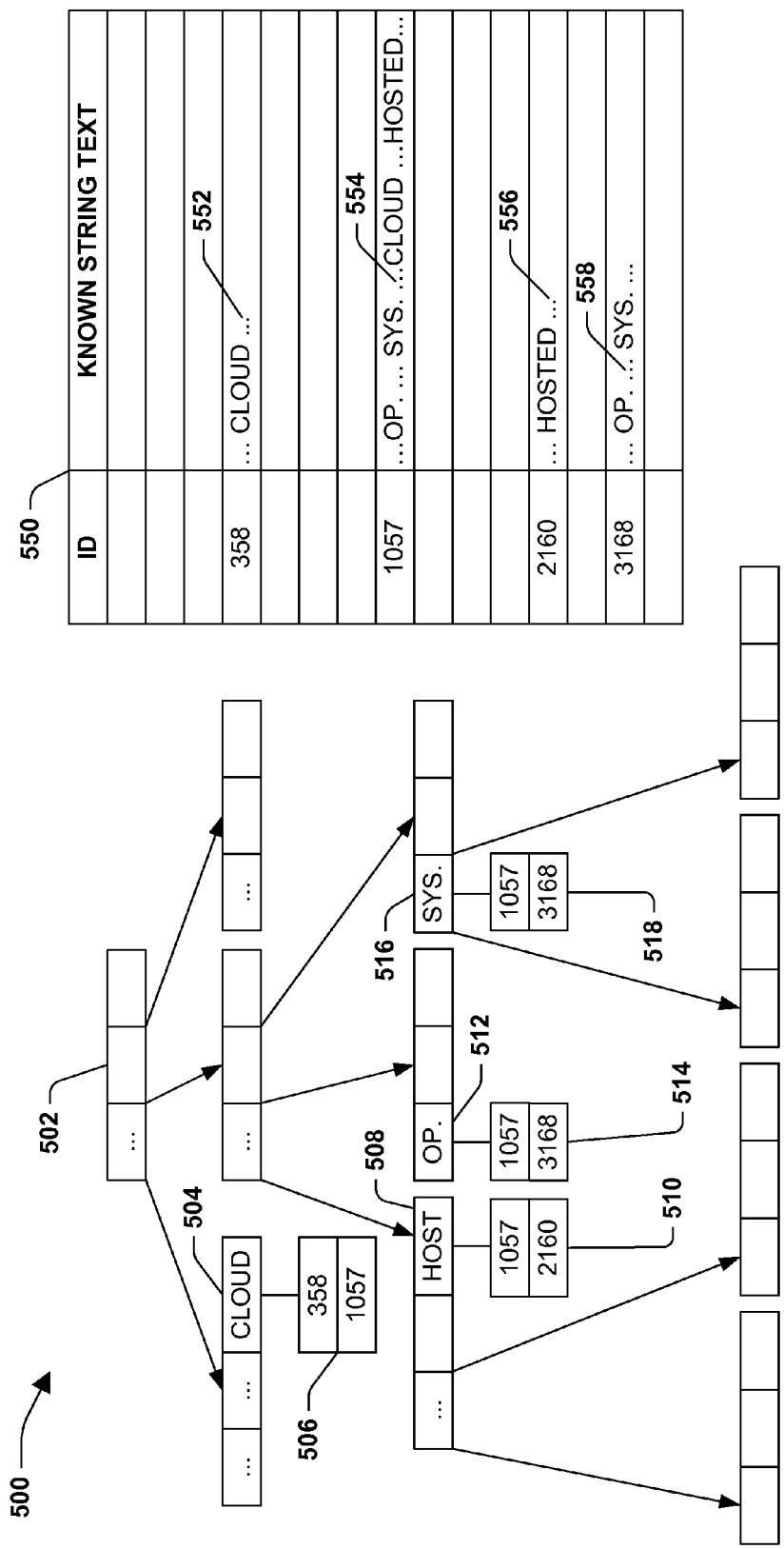
FIG. 5 illustrates an example embodiment implementing an index tree and a corresponding known string database.

As an illustrative example, FIG. 5 illustrates an example embodiment 500 of an implementation of an index tree and corresponding known string database. In this example, an index tree 502 comprises a plurality of nodes 504, 508, 512, 516 (among others), respectively comprising a known term (cloud, host, operating, system). Further, in this example 500, the respective nodes 504, 508, 512, 516 comprise an associated set of one or more known string IDs 506, 510, 514, 518, where the respective known string IDs correspond to a known string 552, 554, 556, 558 in the known string database 550.

It will be appreciated that the example index tree 502 merely shows a portion of the nodes and/or known term that may be populated therein, and that the index tree (e.g., 454 of FIG. 4) may comprise more (or fewer) nodes, respectively comprising a known term and an associated set of one or more known string IDs. Further, it will be appreciated that the known string database 550 merely shows a portion of the entries and/or known strings (e.g., text) populated in the database, and that the known string database (e.g., 352 of FIG. 3) may comprise more (or fewer) entries, respectively comprising a known string (e.g., a word, phrase, or sentence).

In the example embodiment 500, a first target term may comprise the text "cloud," which can be matched to a first known term "cloud" in node 504 of the index tree 502. Further, in this example, the first known term in node 504 is associated with a first set of known string IDs 506, comprising the known string IDs 358 and 1057. A second target term may comprise the text "hosted," which can be matched to a second known term "hosted" in node 508 (abbreviated to "host" in the figure). Additionally, in this example, the second known term in node 508 is associated with a second set of known string IDs 510, comprising the known string IDs 1057 and 2160.

In the example 500, a third target term may comprise the text "operating," which can be matched to a third known term "operating" in node 512 (abbreviated to "op." in the figure). Further, in this example, the third known term in node 512 is associated with a third set of known string IDs 514, comprising the known string IDs 1057 and 3168. A fourth target term may comprise the text "systems," which can be matched to a fourth known term "systems" in node 516 (abbreviated to "sys." in the figure). Additionally, in this example, the fourth known term in node 516 is associated with a fourth set of known string IDs 518, comprising the known string IDs 1057 and 3168.

Returning to FIG. 4, at 414, a number of occurrences can be determined for the respective one or more known string IDs identified in the matching of the one or more target terms to the known terms. As an illustrative example, in FIG. 5, the known string ID 358 was identified once in the first set of known string IDs 506. In this example, the known string ID 1057 was identified four times, once respectively in: the first set of known string IDs 506, the second set of known string IDs 510, the third set of known string IDs 514, and the fourth set of known string IDs 518. Further, the known string ID 2160 was identified once in the second set of known string IDs 510. Additionally, the known string ID 3168 was identified twice, once respectively in: the third set of known string IDs 514, and in the fourth set of known string IDs 518.

In one embodiment, determining the number of occurrences can comprise determining a hit-count for the respective known string IDs identified in the matching. In the example 500 of FIG. 5, a hit count for the respective identified known string IDs may be represented by the following table 1:

| KNOWN STRING ID | HIT COUNT |
| --- | --- |
| 358 | 1 |
| 1057 | 4 |
| 2160 | 1 |
| 3168 | 2 |

In this example table 1, the hit count can comprise a number of times the known string ID is counted during the matching of the target terms to the known terms in the index tree.

In one embodiment, for example, where a larger number of target terms may be matched to the known terms in the index tree and/or two or more known string IDs comprise a same number of hit counts (e.g., 1 for string ID 358 and 1 for string ID 2160), an array may be used to facilitate identifying a number of occurrences of respective known string IDs. In this embodiment, a hit-count dictionary comprising a number of times the respective one or more known string IDs are identified for the one or more target terms may be used. As an example, table 1, described above, may represent a hit-count dictionary, such that the respective known string IDs comprise a corresponding hit count.

Further, in this embodiment, the dictionary can be sorted by order of hit counts. As an example, the above table 1 may be sorted by order of hit counts, and represented by the following table 2:

| KNOWN STRING ID | HIT COUNT |
| --- | --- |
| 1057 | 4 |
| 3168 | 2 |
| 358 | 1 |
| 2160 | 1 |

Additionally, in this embodiment, an array, having a size of a number of target terms identified for the target string, can be populated with an element key comprising a number of hit counts, and with element data comprising a list of one or more known string IDs associated with the element key. As an example, for the target string comprising the text "how to use cloud hosted operating systems," four target terms may be identified (e.g., ignoring the "noise terms"). Therefore, in this embodiment, for example, an array having a size of four can be used. The following example array may represent the hit counts:

| 1 | 2 | 3 | 4 |
| --- | --- | --- | --- |
| 358 | 3168 | | 1057 |
| 2160 | | | | where the element key is the hit count and the element data for respective "buckets" of the array comprise the known string ID corresponding to the hit count.

Returning to FIG. 4, at 416, at the known string ID comprising a desired number of occurrences (e.g., hit counts) can be selected. As an example, a desired number of hit counts may comprise a highest number of hit counts. As an illustrative example, in FIG. 5, the identified known string ID comprising a highest number of hit counts is 1057. In this example, the highest number of hit counts may correspond to a number of times a target term from the target string is found in a corresponding known string 554, thereby comprising a higher number of matching known terms than other known strings 552, 556, 558 in the known string database 550.

Returning to FIG. 4, at 418, the selected known string ID can be matched to a corresponding known string in the known string database 452, resulting in a matched known string 456. As an illustrative example, in FIG. 5, the target string comprising the text "how to use cloud hosted operating systems," may be matched to the known string comprising the text " . . . operating . . . systems . . . cloud . . . hosted . . . in the known string database 550.

In one embodiment, matching the target string to the known string can comprise selecting one or more known strings that respectively correspond to one or more known string IDs associated with a number of occurrences that meet a desired threshold ID count (e.g., threshold hit count). As an example, a user may wish to merely match the target string to those known strings that comprise at least four matching terms. Therefore, in this example, the desired threshold ID count (e.g., threshold hit count) can comprise four, and merely those known strings that comprise four known terms matching at least four of the target terms in the target string may be selected as a match to the target string.

A system may be devised that may be used to determine whether a target string matches one or more known strings from a plurality of known strings. For example, the plurality of known strings may be associated with data, and a user may wish to utilize the associated data for the target string. In this example, if the target string can be matched to one or more of the known strings, the user may be able to utilize the data, associated with the one or more matching known strings, for the target string. The target string can be broken into target terms, which may be respectively matched to a known term in an index tree of known terms from the plurality of known terms. One or more matching known terms may be linked to one or more known strings, which can be matched to the target string.

Figure 6:
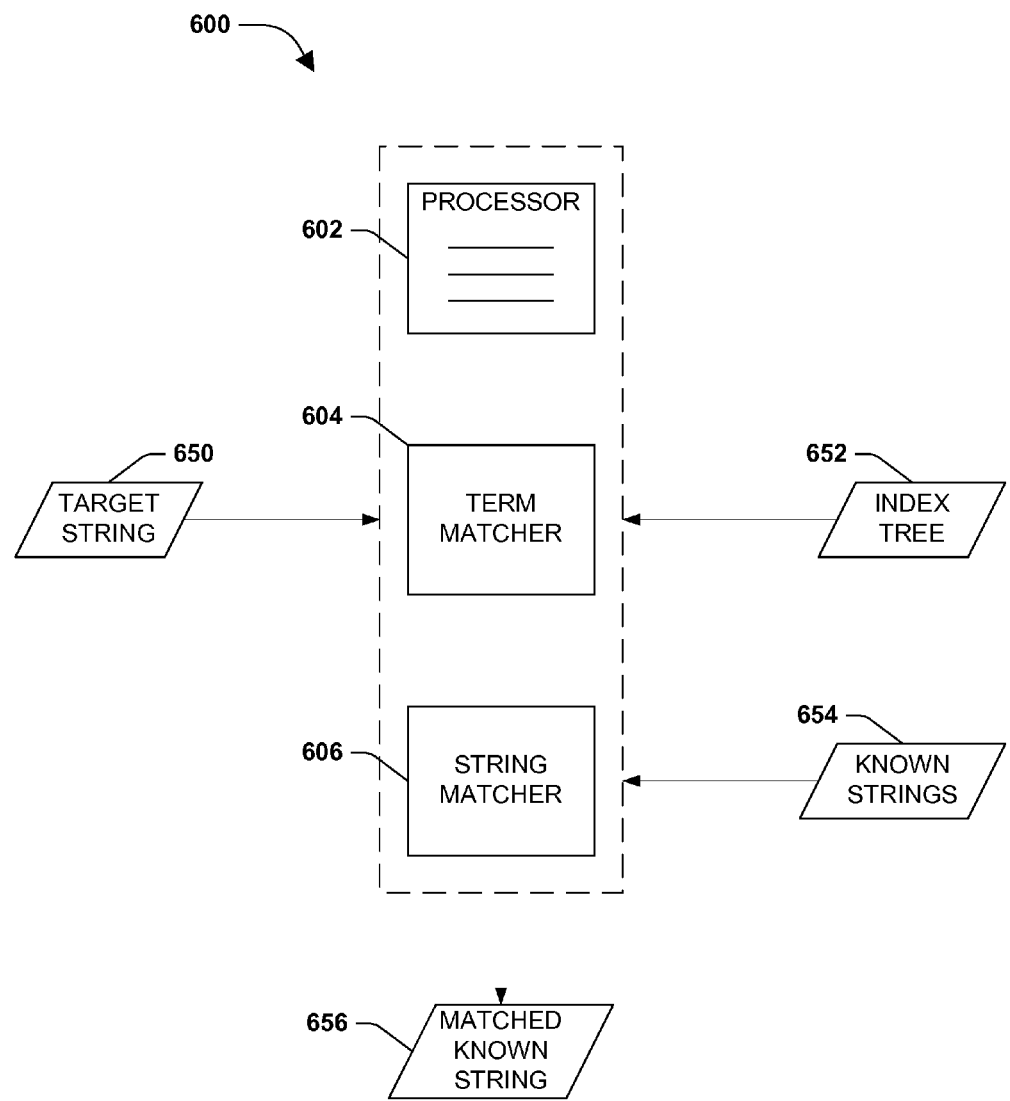
FIG. 6 is a component diagram illustrating an exemplary system for matching a target string to a known string.

FIG. 6 is a component diagram illustrating an exemplary system 600 for matching a target string to a known string. The exemplary system 600 comprises a computer-based processor 602, configured to process data for the system, where the processor 602 is operably coupled with a term matching component 604. The term matching component 604 is configured to match respective one or more target terms, comprised in a target string 650, to a known term in an index tree 652. The index tree 652 comprises one or more known terms from a plurality of known strings, where the respective known terms in the index tree 652 are associated with at least one known string identifier (ID). A known term that is associated with a known string ID appears in a known string 654 that corresponds to the known string ID.

For example, the index tree may be populated with a first known term from a first known string, and the first known term can be associated with (in the index tree) a first known string ID that corresponds to the first known string. Further, the index tree can be populated with a second known term from the first known string, and the second known term can also be associated with the first known string ID. Additionally, the index tree can be populated with a third known term from a second known string, and the third known term can be associated with a second known string ID that corresponds to the second known string, etc.

In the exemplary system 600, a string matching component 606 is operably coupled with the term matching component 604. The string matching component 606 is configured to match the target string 650 to the known string 656 based at least upon the known string's corresponding known string ID that is associated with a desired number of occurrences in the matching of the one or more target terms. As an example, the string matching component 606 may match the target string 650 to the known string 656 that comprises a desired number (e.g., a highest number) of known terms matching the one or more target terms of the target string in the index tree 652.

Figure 7:
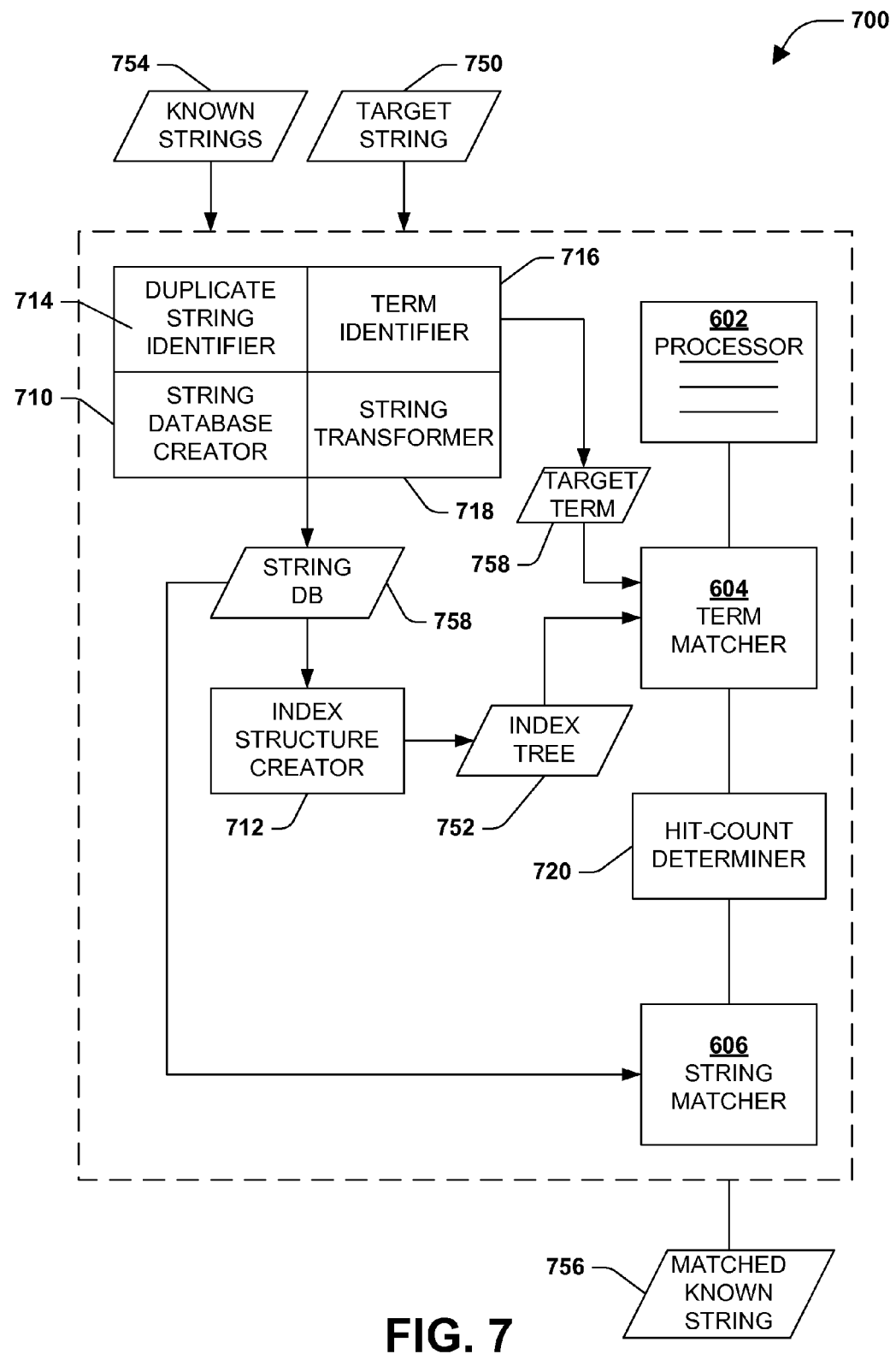
FIG. 7 is a component diagram illustrating an example embodiment where one or more systems described herein may be implemented.

FIG. 7 is a component diagram illustrating an example embodiment 700 where one or more systems described herein may be implemented. In this example 700, an extension of FIG. 6 is provided and thus description of elements, components, etc. described with respect to FIG. 6 may not be repeated at least for simplicity. In the example embodiment 700, a string database creation component 710 can be configured to create a known string database 758 comprising a plurality of known strings 754. The string database creation component 710 can be configured to associate a first known string ID with a first known string; populate the known string database 758 with the first known string and the associated first known string ID; associate a second known string ID with a second known string; and populate the known string database 758 with the second known string and the associated second known string ID. In this way, for example, the known string database can comprise respective known string from the plurality of known strings, where respective known strings in the known string database 758 correspond to a known string ID (e.g., specific to merely the corresponding known string).

A duplicate string identification component 714 can be configured to determine whether a known string being populated into the known string database 758 already exists in the known string database 758. The duplicate string identification component 714 can be configured to generate a first hash value for a first known string and a third hash value for a third known string, for example, using one or more hash functions; associate the first hash value with the first known string in the known string database 758; compare the third hash value with the first hash value; and block the populating of the third known string to the known string database 758 if the third hash value matches the first hash value. In this way, for example, a known string may be populated to the known string database 758 merely once.

In the example embodiment 700, an index structure creation component 712 can be configured to create an index tree 752, for example, comprising respective known terms comprised in the known string in the known string database 758. The index structure creation component 712 can be configured to populate the index tree 752 with respective one or more first known terms comprised in a first known string; link the first known string ID to the respective one or more first known terms in index tree 752; populate the index tree 752 with a second known term comprised in a second known string, merely if the second known term does not match one or more of the one or more first known terms already added to the index tree; link the second known string ID to the second known term in index tree 752 (e.g., where the second known term did not match any terms in the index tree and thus is added to the index tree); and link the second known string ID to a first known term populated in index tree 752 that matches the second known term (e.g., where the second known term did match a term in the index tree and thus is not added to the index tree (again), rather merely the second known string ID is associated with matched term). In this way, for example, the index tree 752 can be populated with the respective known terms comprised in the known strings from the known string database 758, and associated the respective known terms in the index tree 752 with at least one known string ID corresponding to a known string comprising the known term.

In the example embodiment 700, a term identification component 716 can be configured to break one or more of the plurality of known strings 754 into the one or more known terms, for example, which may respectively be populated into the index tree 752. Further, the term identification component 716 can be configured to break the target string 750 into the one or more target terms 770, which may respectively be matched to a known term in the index tree 752 by the term matching component 604.

In the example embodiment 700, a string transformation component 718 can be configured to remove one or more noise words from the target string 750, and/or remove one or more noise words from the plurality of known strings 754. For example, a "noise term" can comprise a term that may not yield a useful search result, and may merely add "noise" to the result when matching a target string to a known string. In this example, the string transformation component 718 may identify the "noise terms" in the target string and/or the one or more known strings, and remove the "noise terms" such that the matching of the target string to the known string 756 may yield more useful results.

Further, the string transformation component 718 can be configured to normalize the respective one or more target terms 770, and/or normalize the respective one or more known terms populated to the index tree 752. As an example, language-based strings (e.g., the English language) can comprise words that may be arranged differently for linguistic purposes. For example, words may comprise a singular or plural form; words can be changed due to tense differences of verbs; and other possible arrangements of a same word. In one embodiment, the known terms in the index tree 752 and the target terms used for the matching may be normalized, for example, so that the matching may be improved. As an illustrative example, a plural may be normalized to a singular form and a past tense may be normalized to a present tense.

In the example embodiment 700, a hit-count determination component 720 can be configured to count a number of times a matching known string ID is identified for the target string 750, where the matching known string ID is associated with a matching term; and identify one or more matching known string IDs that meets a desired threshold ID count (e.g., threshold hit count). For example, a matching term can comprise a target term 770 that is matched to a known term in the index tree 752 by the term matching component 604, and the hit-count determination component 720 can count a number of times a known string ID, associated with the matching term, is identified. In one embodiment, the desired threshold ID count (e.g., threshold hit count) can comprise a highest number of hit counts for the known string ID, for example, where the known string comprising the known string ID with the highest number of hit counts may comprise the matched known string 756 (matched to the target string).

Figure 8:
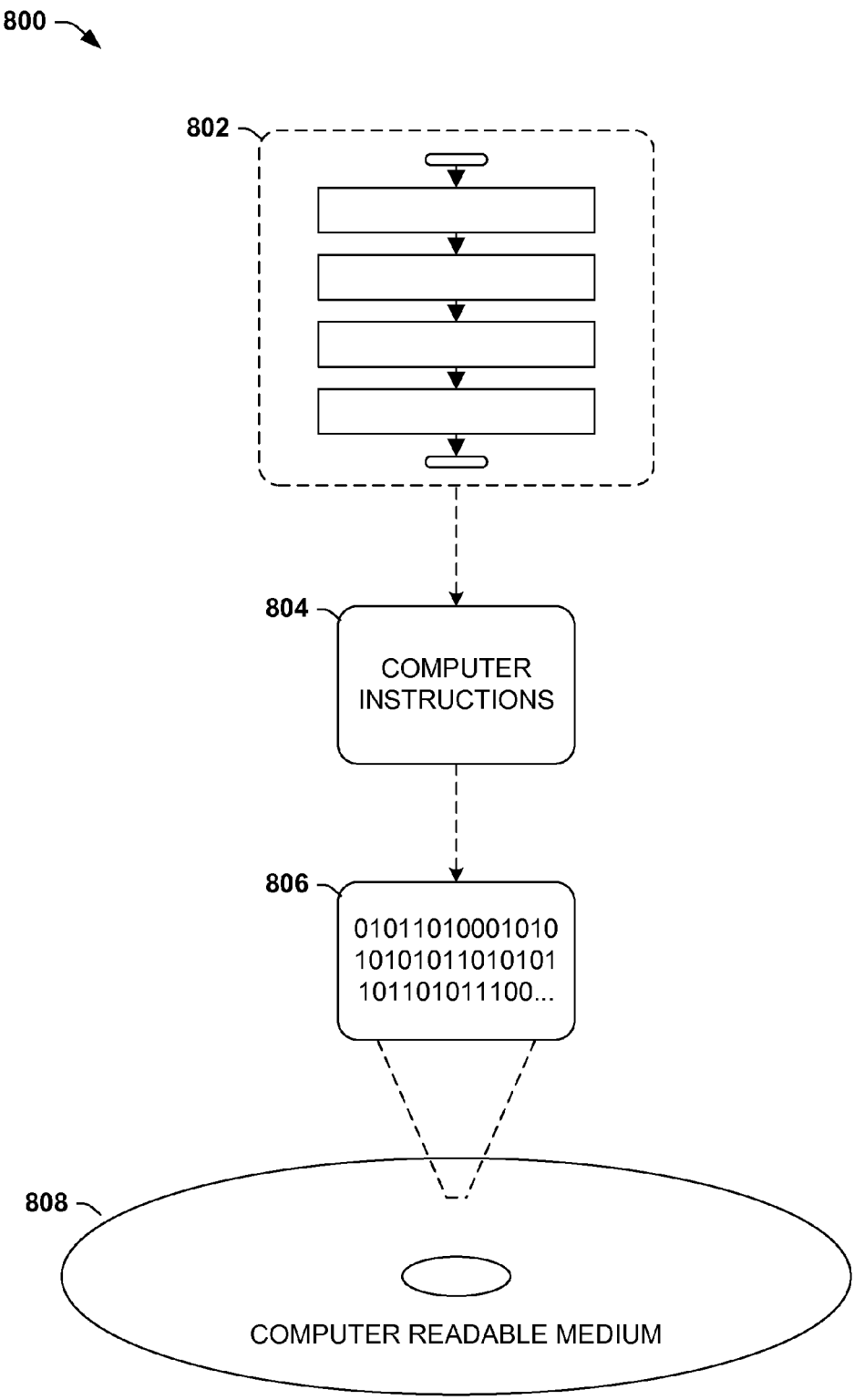
FIG. 8 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 808 (e.g., a CD-R, DVD-R, or a platter of a hard disk drive), on which is encoded computer-readable data 806. This computer-readable data 806 in turn comprises a set of computer instructions 804 configured to operate according to one or more of the principles set forth herein. In one such embodiment 802, the processor-executable instructions 804 may be configured to perform a method, such as at least some of the exemplary method 100 of FIG. 1, for example. In another such embodiment, the processor-executable instructions 804 may be configured to implement a system, such as at least some of the exemplary system 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
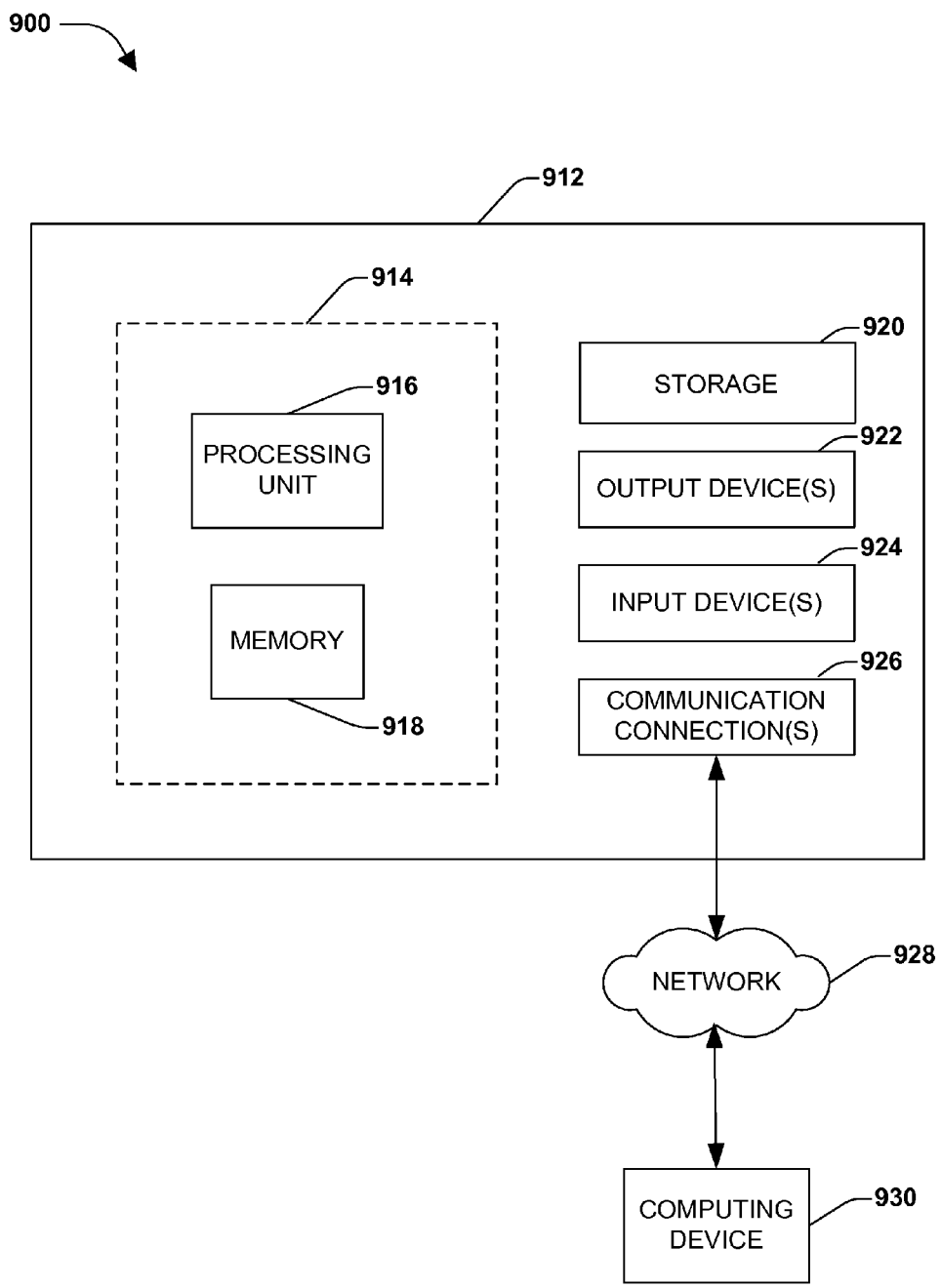
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
   matching a first target term, comprised in a target string, to a first known term in an index tree, the first known term associated with a known string identifier (ID);
   matching a second target term, comprised in the target string, to a second known term in the index tree, the second known term associated with the known string ID;
   responsive to determining that a threshold number of target terms, comprising the first target term and the second target term, comprised in the target string are respectively matched with a known term associated with the known string ID, matching the target string to a known string associated with the known string ID; and
   presenting one or more terms associated with the known string on a computing device, at least some of the method implemented at least in part via a processing unit.

2. The method of claim 1, the one or more terms comprising a translation of the known string, the known string in a first language, the translation of the known string in a second language different than the first language.

3. The method of claim 1, comprising populating a string database with a plurality of known strings, including the known string, respective known strings in the string database associated with known string IDs.

4. The method of claim 3, a second known string in the string database associated with a second known string ID different than the known string ID.

5. The method of claim 3, comprising determining if a second known string is comprised in the string database by comparing a string hash value for the second known string to existing string hash values for the plurality of known strings in the string database.

6. The method of claim 1, the threshold number of target terms less than a total number of target terms in the target string.

7. The method of claim 1, comprising before the matching a first target term, populating the index tree with the first known term in association with the known string ID.

8. A system, comprising:
   one or more processing units comprising hardware; and
   memory comprising instructions that when executed by at least one of the one or more processing units perform a method comprising:
      matching a first target term, comprised in a target string, to a first known term in an index tree, the first known term associated with a known string identifier (ID);
      matching a second target term, comprised in the target string, to a second known term in the index tree, the second known term associated with the known string ID; and
      responsive to determining that a threshold number of target terms, comprising the first target term and the second target term, comprised in the target string are respectively matched with a known term associated with the known string ID, matching the target string to a known string associated with the known string ID.

9. The system of claim 8, the first target term different than the second target term.

10. The system of claim 8, the method comprising populating a string database with a plurality of known strings, including the known string, respective known strings in the string database associated with known string IDs.

11. The system of claim 10, a second known string in the string database associated with a second known string ID different than the known string ID.

12. The system of claim 10, the method comprising determining if a second known string is comprised in the string database by comparing a string hash value for the second known string to existing string hash values for the plurality of known strings in the string database.

13. The system of claim 8, the threshold number of target terms less than a total number of target terms in the target string.

14. The system of claim 8, the method comprising before the matching a first target term, populating the index tree with the first known term in association with the known string ID.

15. A computer storage device comprising instructions that when executed perform a method, comprising:

matching a first target term, comprised in a target string, to a first known term in an index tree, the first known term associated with a known string identifier (ID);

matching a second target term, comprised in the target string, to a second known term in the index tree, the second known term associated with the known string ID; and responsive to determining that a threshold number of target terms, comprising the first target term and the second target term, comprised in the target string are respectively matched with a known term associated with the known string ID, matching the target string to a known string associated with the known string ID.

16. The computer storage device of claim 15, the first target term different than the second target term.

17. The computer storage device of claim 15, the method comprising populating a string database with a plurality of known strings, including the known string, respective known strings in the string database associated with known string IDs.

18. The computer storage device of claim 17, a second known string in the string database associated with a second known string ID different than the known string ID.

19. The computer storage device of claim 17, the method comprising determining if a second known string is comprised in the string database by comparing a string hash value for the second known string to existing string hash values for the plurality of known strings in the string database.

20. The computer storage device of claim 15, the method comprising before the matching a first target term, populating the index tree with the first known term in association with the known string ID.

* * * * *